US010056601B2

(12) United States Patent
Sakai et al.

(10) Patent No.: US 10,056,601 B2
(45) Date of Patent: Aug. 21, 2018

(54) BATTERY PACK

(71) Applicant: KABUSHIKI KAISHA TOYOTA JIDOSHOKKI, Aichi-ken (JP)

(72) Inventors: Takashi Sakai, Kariya (JP); Takayuki Kato, Kariya (JP); Hiromi Ueda, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 91 days.

(21) Appl. No.: 15/117,886

(22) PCT Filed: Feb. 16, 2015

(86) PCT No.: PCT/JP2015/054149
§ 371 (c)(1),
(2) Date: Aug. 10, 2016

(87) PCT Pub. No.: WO2015/133253
PCT Pub. Date: Sep. 11, 2015

(65) Prior Publication Data
US 2017/0012276 A1    Jan. 12, 2017

(30) Foreign Application Priority Data

Mar. 7, 2014    (JP) .................................. 2014-045209

(51) Int. Cl.
*H01M 2/34*    (2006.01)
*H01M 2/10*    (2006.01)
(Continued)

(52) U.S. Cl.
CPC ......... *H01M 2/347* (2013.01); *H01M 2/1077* (2013.01); *H01M 2/305* (2013.01);
(Continued)

(58) Field of Classification Search
CPC . H01M 2/0242; H01M 2/0245; H01M 2/0247
See application file for complete search history.

(56) References Cited

U.S. PATENT DOCUMENTS

| 2008/0118819 A1* | 5/2008 | Gamboa | H01M 2/0245 |
| | | | 429/61 |
| 2011/0117401 A1* | 5/2011 | Lee | H01M 2/0245 |
| | | | 429/82 |

(Continued)

FOREIGN PATENT DOCUMENTS

| CN | 102088104 | 6/2011 |
| CN | 102117930 | 7/2011 |

(Continued)

OTHER PUBLICATIONS

English translation of Written Opinion of the International Search Report issued in International Patent Application No. PCT/JP2015/054149, dated Mar. 31, 2015.

(Continued)

*Primary Examiner* — Ula C Ruddock
*Assistant Examiner* — Amanda J Barrow
(74) *Attorney, Agent, or Firm* — Greenblum & Bernstein, P.L.C.

(57) ABSTRACT

A battery pack includes a casing having an inner surface and a battery module accommodated in the casing. The battery module includes a battery unit and two end plates. The battery unit includes battery cells that are arranged side by side. The end plates hold the battery unit in between. At least one of the end plates has a projection that projects further toward the inner surface of the casing than the battery unit.

5 Claims, 4 Drawing Sheets

(51) Int. Cl.
*H01M 2/30* (2006.01)
*H01M 2/20* (2006.01)

(52) U.S. Cl.
CPC ........ *H01M 2/206* (2013.01); *H01M 2200/00* (2013.01); *H01M 2220/20* (2013.01)

(56) References Cited

U.S. PATENT DOCUMENTS

| | | |
|---|---|---|
| 2011/0165451 A1 | 7/2011 | Kim et al. |
| 2012/0214046 A1 | 8/2012 | Lim |
| 2013/0095355 A1 | 4/2013 | Okutani et al. |

FOREIGN PATENT DOCUMENTS

| | | | | |
|---|---|---|---|---|
| JP | 2008-251352 | | 10/2008 | |
| JP | 2008-277058 | | 11/2008 | |
| JP | 2012-174693 | | 9/2012 | |
| WO | 2012/001858 | | 1/2012 | |
| WO | 2014/065110 | | 5/2014 | |
| WO | WO 2014/065110 | * | 5/2014 | .............. H01M 2/10 |

OTHER PUBLICATIONS

English translation of International Preliminary Report on Patentability issued in International Patent Application No. PCT/JP2015/054149, dated Sep. 13, 2016.
International Search Report issued in International Patent Application No. PCT/JP2015/054149, dated Mar. 31, 2015, along with English language translation.
Office Action in corresponding Chinese Patent Application No. CN201580011205.2 dated Feb. 24, 2018.

* cited by examiner

BATTERY PACK

TECHNICAL FIELD

The present invention relates to a battery pack that includes a battery module accommodated in a casing.

BACKGROUND ART

For example, Patent Document 1 discloses a battery pack including battery cells accommodated in a casing. The battery pack of Patent Document 1 includes a plurality of battery cells (electric cells) in a casing (a module case).

PRIOR ART DOCUMENT

Patent Document

Patent Document 1: Japanese Laid-Open Patent Publication No. 2008-251352

SUMMARY OF THE INVENTION

Problems that the Invention is to Solve

When vibrations or impacts are applied to the battery pack, the battery cells can strike the inner surface of the casing. Thus, it is desired to protect the battery cells when vibrations or impacts are applied to a battery pack.

Accordingly, it is an objective of the present invention to provide a battery pack that protects battery cells.

Means for Solving the Problems

To achieve the foregoing objective and in accordance with one aspect of the present invention, a battery pack includes a casing having an inner surface and a battery module accommodated in the casing. The battery module includes a battery unit having a plurality of battery cells, which are arranged side by side, and two end plates, which hold the battery unit in between. At least one of the end plates has a projection, which projects further toward the inner surface of the casing than the battery unit.

MODES FOR CARRYING OUT THE INVENTION

A battery pack according to one embodiment will now be described.

Figure 1:
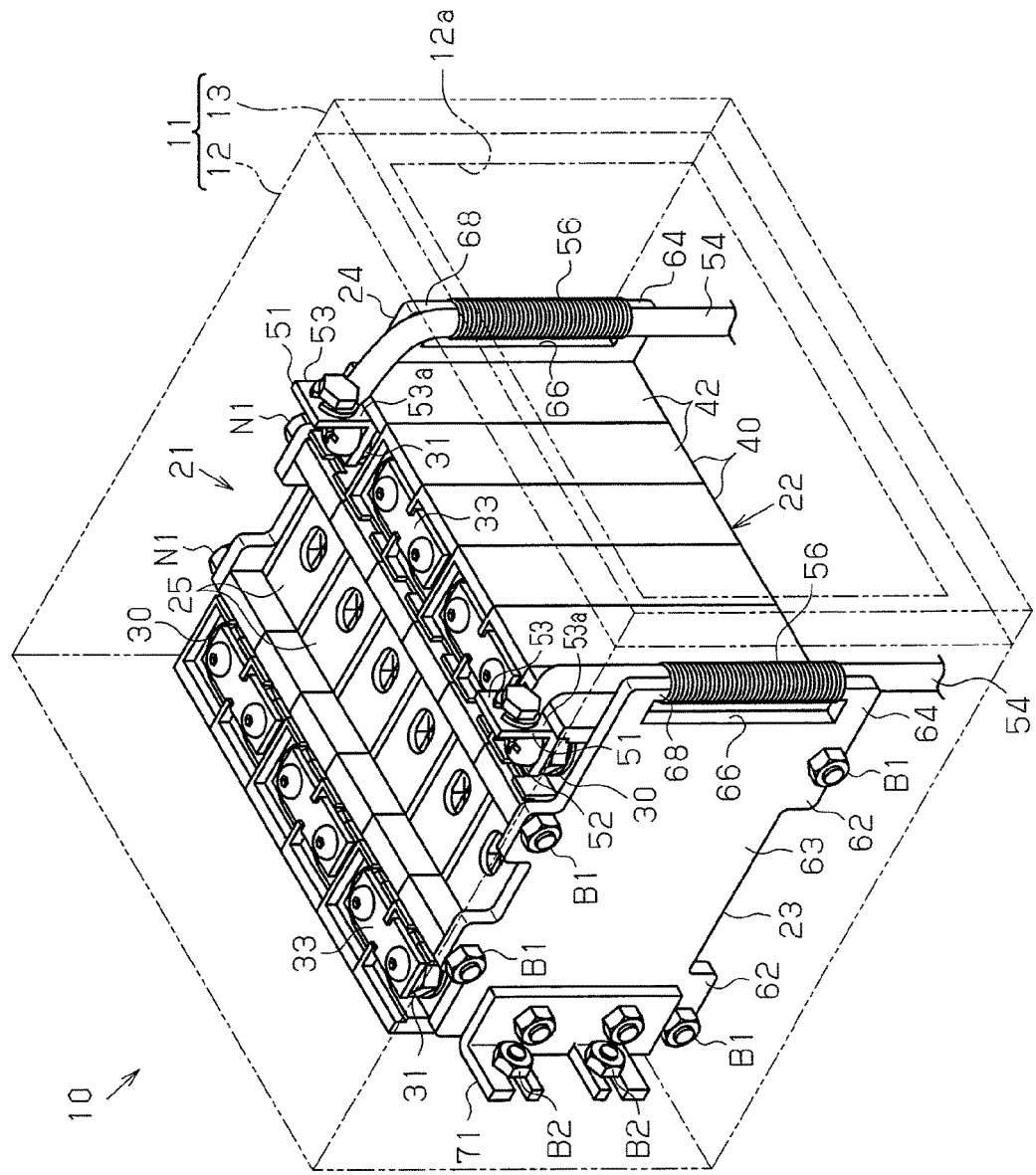
FIG. 1 is a perspective view showing a battery pack according to one embodiment.

As shown in FIG. 1, a battery pack 10 includes a casing 11. The casing 11 includes a main body 12, which has an opening 12a, and a lid member 13, which closes the opening 12a of the main body 12. The main body 12 is shaped as a box with the opening 12a. The lid member 13 is shaped as a flat plate. The casing 11 accommodates a battery module 21.

Figure 2:
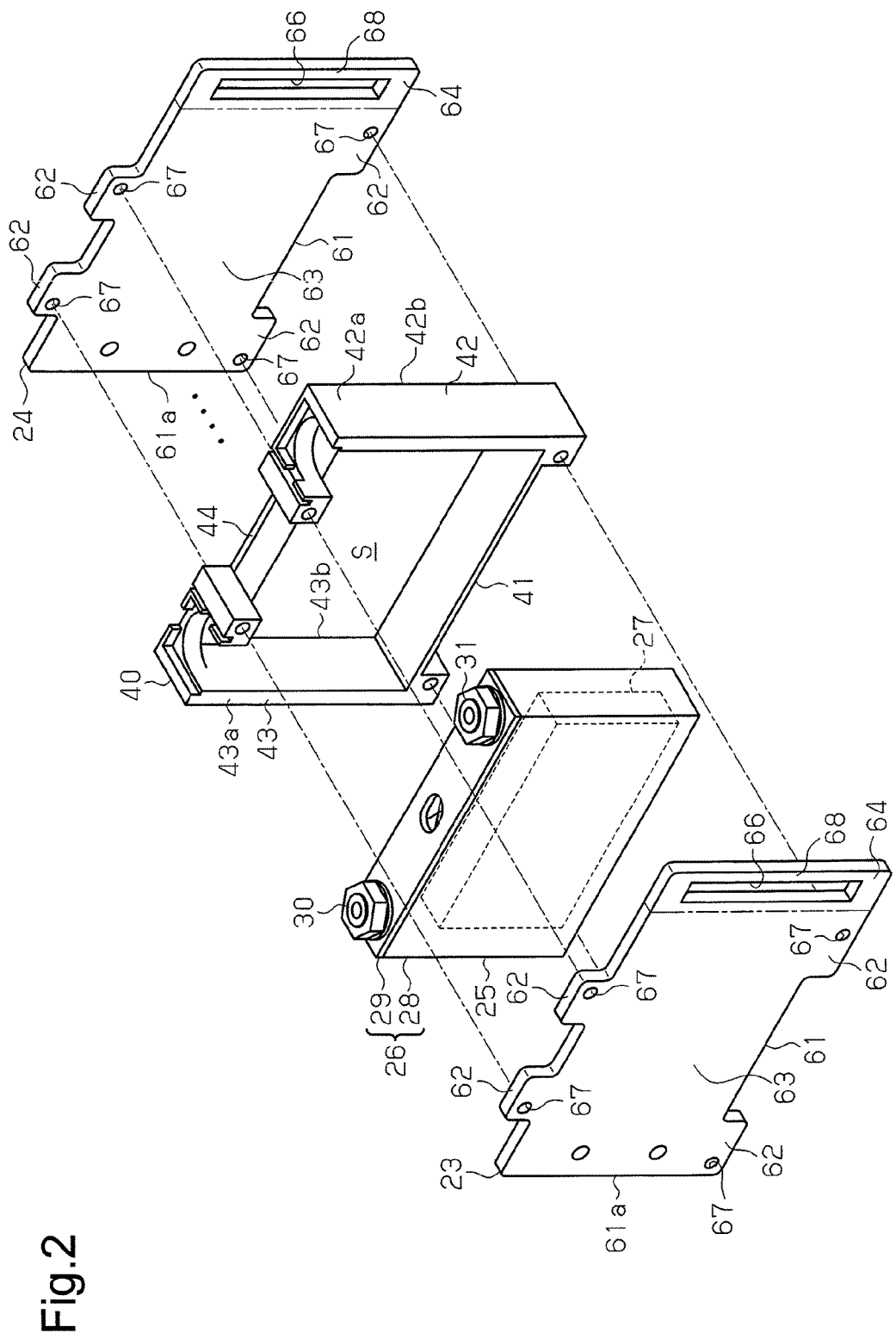
FIG. 2 is an exploded perspective view illustrating end plates, a battery cell, and a battery holder.

As shown in FIGS. 1 and 2, the battery module 21 includes a battery unit 22 and two end plates 23, 24, which hold the battery unit 22 in between. The battery unit 22 has battery cells 25 arranged side by side and battery holders 40 respectively holding the battery cells 25. Each battery cell 25 includes a battery case 26, which accommodates an electrode assembly 27. The battery case 26 includes a box-shaped case body 28, which has an opening, and a plate-shaped lid 29, which closes the opening of the case body 28. A positive terminal 30 and a negative terminal 31 project from the lid 29.

The battery holder 40 has a first covering portion 41, which is shaped as a rectangular flat plate. A second covering portion 42 is provided at one end of the first covering portion 41 in the longitudinal direction, and a third covering portion 43 is provided at the other end of the first covering portion 41 in the longitudinal direction. The second covering portion 42 and the third covering portion 43 are each shaped as a rectangular flat plate that extends in the thickness direction of the first covering portion 41. The second covering portion 42 has a first longitudinal edge section 42a and a first transverse edge section 42b. The third covering portion 43 has a first longitudinal edge section 43a and a first transverse edge section 43b. A fourth covering portion 44 extends between parts of the first transverse edge sections 42b, 43b that correspond to the first longitudinal edge sections 42a, 43a. The first longitudinal edge section 42a of the second covering portion 42 is an edge section opposite to the edge section at which the first covering portion 41 is provided. The first longitudinal edge section 43a of the third covering portion 43 is an edge section opposite to the edge section at which the first covering portion 41 is provided. The region surrounded by the first covering portion 41, the second covering portion 42, and the third covering portion 43 serves as an accommodating portion S, in which the battery cell 25 is accommodated.

Figure 3:
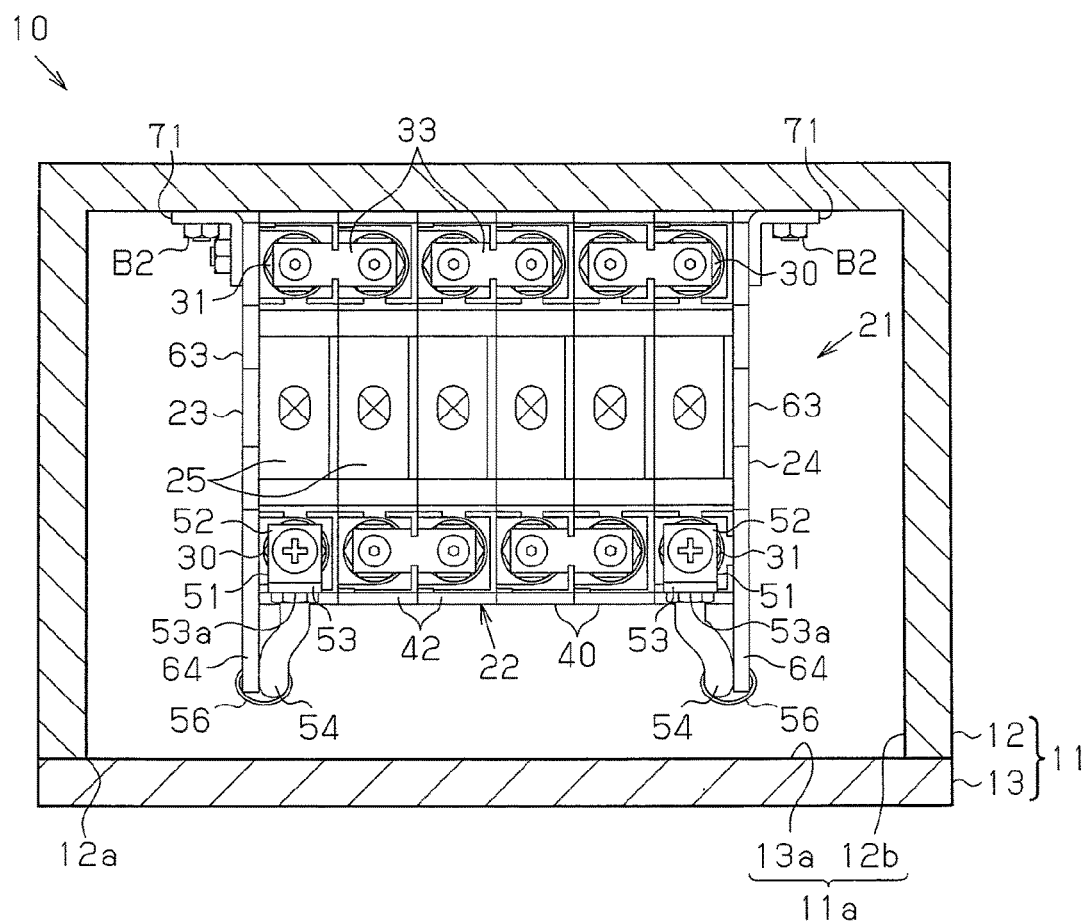
FIG. 3 is a cross-sectional view showing the battery pack of the embodiment.

As shown in FIGS. 1 to 3, the battery unit 22 is configured by arranging the battery cells 25, each held by a battery holder 40, side by side. The battery cells 25 are arranged such that the positive terminal 30 of each battery cell 25 is adjacent in the arrangement direction to the negative terminal 31 of the adjacent battery cell 25. In the present embodiment, six battery cells 25 are arranged side by side. The battery cells 25 are connected in series by connecting the positive terminal 30 of each battery cell 25 and the negative terminal 31 of the adjacent battery cell 25 with a bus bar 33.

An L-shaped connecting terminal 51 is attached to the positive terminal 30 of one of the two battery cells 25 at the opposite ends in the arrangement direction. Another L-shaped connecting terminal 51 is attached to the negative terminal 31 of the battery cell 25 at the other end in the arrangement direction. The positive terminal 30 of one of the battery cells 25 at the opposite ends in the arrangement direction and the negative terminal 31 of the battery cell 25 at the other end in the arrangement direction are located on one side in the arrangement direction of the positive terminal 30 and the negative terminal 31 in each battery cell 25 in the battery unit 22, that is, on the side corresponding to the second covering portion 42 in each battery holder 40 of the battery unit 22.

Each connecting terminal 51 includes a rectangular flat plate-shaped connecting portion 52, which is connected to a positive terminal 30 or a negative terminal 31, and a rectangular flat plate-shaped output portion 53, which extends perpendicularly from an end of the connecting portion 52. A harness 54 is connected to the output portion 53 of each connecting terminal 51. Specifically, one of the surfaces that are perpendicular to the thickness direction of the output portion 53 is defined as a connecting surface 53a. The connecting surface 53a is on the opposite side from the connecting portion 52. The harness 54 is attached to the connecting surface 53a. Accordingly, each harness 54 is connected to the battery module 21 (the corresponding battery cell 25) via the corresponding connecting terminal 51. The harnesses 54 are connected to a load (not shown).

As shown in FIG. 2, the two end plates 23, 24, which hold the battery unit 22 in between, have the same shape. Each of the end plates 23, 24 includes a rectangular plate-shaped base portion 61 and four bolt tabs 62, which project from the base portion 61. Each bolt tab 62 has an insertion hole 67, which extends through the thickness of the end plates 23, 24.

The base portion 61 includes a rectangular flat plate-shaped facing portion 63 and a rectangular flat plate-shaped projection 64, which is provided at a first end of the facing portion 63 in the longitudinal direction.

The projection 64 has a through-hole 66, which extends through the thickness. The projection 64 includes an opening periphery 68, which constitutes the through-hole 66. The through-hole 66 of the present embodiment is an elongated hole that extends in the longitudinal direction of the projection 64, that is, in the transverse direction of the base portion 61.

The dimension in the longitudinal direction of the base portion 61 is longer than the width of the battery holders 40. That is, the dimension in the longitudinal direction of the base portion 61 is longer than the dimension between the outer surface of the second covering portion 42 and the outer surface of the third covering portion 43. More specifically, the second covering portion 42 of each battery holder 40 has surfaces in the thickness direction, one of which is located on the opposite side from the accommodating portion S. The third covering portion 43 of each battery holder 40 has surfaces in the thickness direction, one of which is located on the opposite side from the accommodating portion S. The dimension in the longitudinal direction of the base portion 61 is longer than the dimension between those surfaces on the opposite sides from the accommodating portion S. The base portion 61 has a second end 61a in the longitudinal direction (an end opposite from the projection 64). The end plates 23, 24 are assembled such that the second end 61a of the base portion 61 and the third covering portion 43 of the battery holder 40 face each other in the arrangement direction of the battery cells 25. Accordingly, a part of the base portion 61 faces the battery unit 22, and another part projects from the second covering portion 42 in the longitudinal direction of the base portion 61. The part of the base portion 61 that faces the battery unit 22 is the facing portion 63, and the part that projects from the second covering portion 42 in the longitudinal direction of the base portion 61 is the projection 64.

As shown in FIG. 1, the two end plates 23, 24 hold the battery unit 22 in between. Bolts B1 are passed from the insertion holes 67 of the end plate 23 to the other end plate 24. Each bolt B1 is threaded to a nut N1 after being passed through the corresponding insertion hole 67 of the end plate 24. Accordingly, the end plates 23, 24 restrain the battery unit 22. The battery module 21 is configured in the above described manner.

Each harness 54, which is connected to one of the connecting terminals 51, is attached to the corresponding projection 64 with an attaching member 56. The attaching members 56 are, for example, metal wires. The attaching members 56 bind the harnesses 54 to the opening peripheries 68 of the projections 64. Specifically, each attaching member 56 is a metal wire that attaches the harness 54 to a part of the opening periphery 68 of the projection 64 that is located on the opposite side of the through-hole 66 from the facing portion 63. Thus, the opening periphery 68 of each through-hole 66 corresponds to an attachment portion of the projection 64.

As shown in FIGS. 1 and 3, the above described battery module 21 is fixed to the casing 11 with brackets 71 provided on the end plates 23, 24. The brackets 71 of the battery module 21 are fixed to the casing 11 with bolts B2. The battery module 21 is fixed to one of inner surfaces 11a of the casing 11 that is opposite from the lid member 13 (the bottom of the main body 12). The end plates 23, 24 project further toward an inner surface 13a of the lid member 13 than the battery unit 22. The inner surfaces 11a of the casing 11 include an inner surface 12b of the main body 12 and the inner surface 13a of the lid member 13.

The inner surface 13a of the lid member 13 is one of the inner surfaces 11a of the casing 11 that faces the projections 64 and intersects the projecting direction of the projections 64.

The projections 64 project away from one of the inner surfaces 11a of the casing 11 to which the battery module 21 is fixed.

In the present embodiment, the shortest distance between the projections 64 and the inner surface 13a of the lid member 13 is shorter than the shortest distance between the battery unit 22 and the inner surface 13a of the lid member 13.

In other words, the shortest distance between the projections 64 and the surface 13a, which is one of the inner surfaces 11a of the casing 11 that faces the projections 64 and intersects the projecting direction of the projections 64, is shorter than the shortest distance between the battery unit 22 and the surface 13a, which is one of the inner surfaces 11a of the casing 11 that faces the projections 64 and intersects the projecting direction of the projections 64. That is, the projections 64 are configured such that, even if the projections 64 contact one of the inner surfaces 11a of the casing 11, or the inner surface 13a of the lid member 13, the battery unit 22 does not contact that one of the inner surfaces 11a of the casing 11, or the inner surface 13a of the lid member 13.

The connecting surface 53a of the output portion 53 of each connecting terminal 51 faces the inner surface 13a of the lid member 13.

Operation of the battery pack 10 of the present embodiment will now be described.

The battery pack 10 of the present embodiment is mounted, for example, on a vehicle. As the vehicle travels, the battery pack 10 receives vibrations and impacts. At this time, if the distance between the battery module 21 and any of the inner surfaces 11a of the casing 11 is small, or if the bolts B2, which fix the brackets 71 to the casing 11, have been loosened due to vibrations and impacts, the battery module 21 may strike any of the inner surfaces 11a of the casing 11. Also, to attach the harnesses 54 to the connecting surfaces 53a of the connecting terminals 51, the operation for attaching the harnesses 54 is performed through the opening 12a of the casing 11 after the battery module 21 is accommodated in the main body 12. At this time, the attaching operation of the harnesses 54 is facilitated if the connecting surfaces 53a of the connecting terminals 51 face the opening 12a. However, if the connecting surfaces 53a of the connecting terminals 51 face the opening 12a, the connecting surfaces 53a will face the lid member 13 after the lid member 13 is fixed to the main body 12. Thus, when the battery module 21 strikes the lid member 13, the connecting surfaces 53a of the connecting terminals 51 may strike the lid member 13, which can establish a short circuit.

In the present embodiment, when the battery module 21 strikes the lid member 13, the projections 64 of the end plates 23, 24, which project toward the lid member 13, strike the inner surface 13a of the lid member 13. This prevents the battery unit 22 from striking the lid member 13.

The projections 64 project toward the lid member 13. Thus, when the battery module 21 strikes the lid member 13, the projections 64 prevent the connecting surfaces 53a of the connecting terminals 51 from striking the lid member 13. This prevents the battery cell 25 from establishing a short circuit.

The above described embodiment has the following advantages.

(1) The end plates 23, 24 have the projections 64. Thus, when the battery module 21 strikes any of the inner surfaces 11a of the casing 11, the projections 64 strike an inner surface of the casing 11, that is, the inner surface 13a of the lid member 13, so that the battery unit 22 is protected.

Also, even if the connecting surfaces 53a of the connecting terminals 51 face one of the inner surfaces 11a of the casing 11, that is, the inner surface 13a of the lid member 13, the output portions 53 are prevented from striking the lid member 13. This prevents the battery cell 25 from establishing a short circuit.

(2) The connecting surfaces 53a of the connecting terminals 51 face the inner surface 13a of the lid member 13. Thus, when attaching the harnesses 54, the attaching operation is facilitated, so that the harnesses 54 are easily attached.

(3) Since projections 64 of the end plates 23, 24 have the through-holes 66, the weight of the end plates 23, 24 is reduced. Also, compared to a case in which through-holes 66 are provided in the base portions 61, the through-holes 66 in the projections 64 reduce the weight of the end plates 23, 24 without reducing the holding force of the end plates 23, 24.

(4) If the harnesses 54 strike one of the inner surfaces 11a of the casing 11, that is, the inner surface 13a of the lid member 13, the harnesses 54 may be damaged. Thus, movement of the harnesses 54 needs to be restricted. Since the projections 64 have the through-holes 66, the harnesses 54 can be attached to the opening peripheries 68, which configure the through-holes 66. Accordingly, movement of the harnesses 54 can be restricted by using the projections 64.

(5) Since the harnesses 54 are attached with the attaching members 56, the harnesses 54 are covered with the attaching members 56. Thus, the harnesses 54 are protected by the attaching members 56.

(6) The through-holes 66 of the end plates 23, 24 are elongated holes. Thus, the area occupied by each opening periphery 68, which configures the through-hole 66, is large, allowing the harness 54 to be firmly fixed.

The embodiment may be modified as follows.

Figure 4:
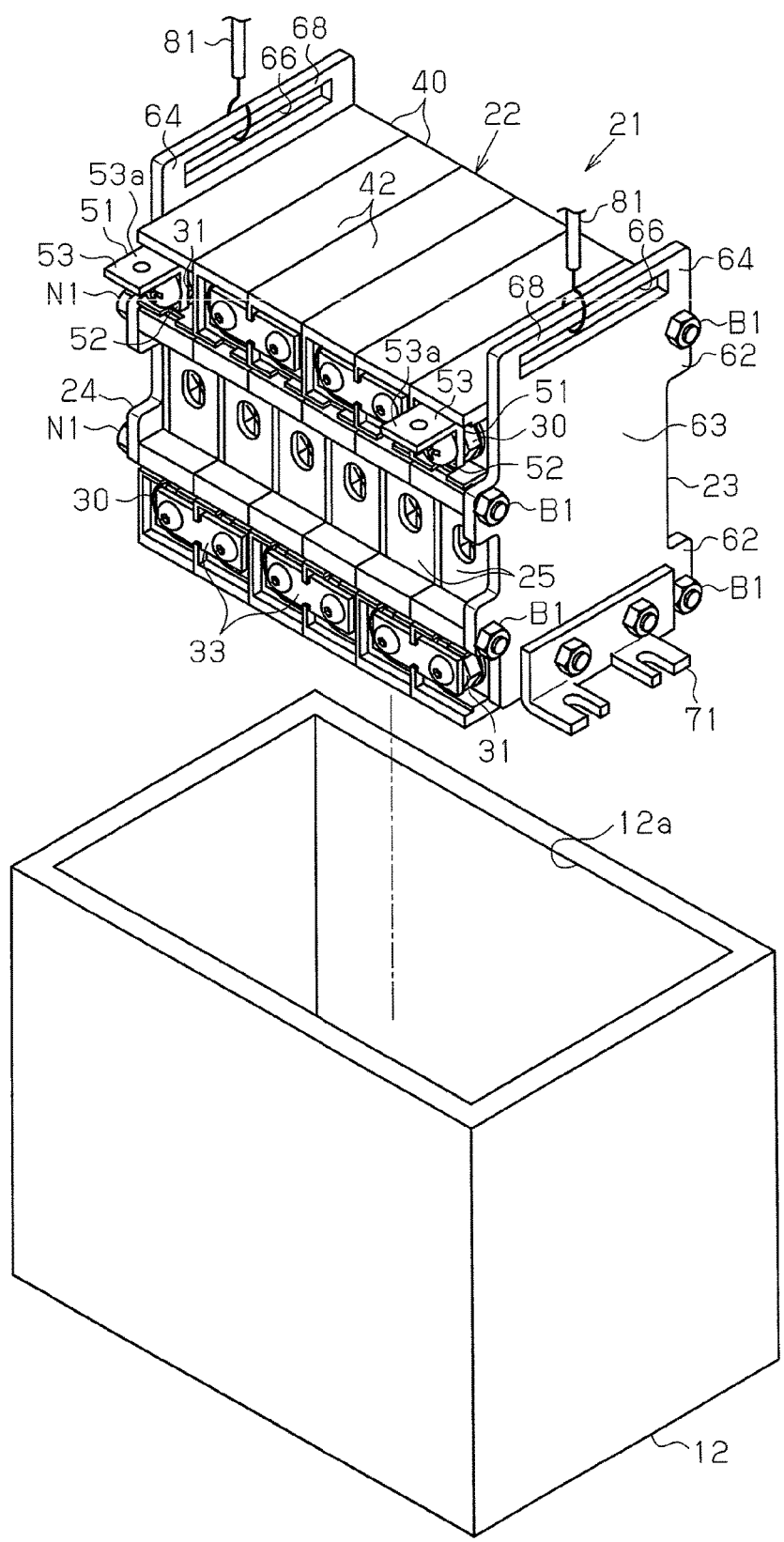
FIG. 4 is a perspective view showing a battery pack according to a modification.

As shown in FIG. 4, the projections 64 may be used as hoisting attachment receiving portions, to which hoisting attachments 81 are hooked. When fixing the battery module 21 to the casing 11, the opening 12a of the main body 12 is oriented upward, and the battery module 21 is accommodated in the main body 12 through the opening 12a. The battery module 21 is accommodated in the main body 12 while being suspended with the hoisting attachments 81. At this time, the hoisting attachments 81 must be hooked to the battery module 21. This is achieved by hooking the hoisting attachments 81 to the through-holes 66 in the projections 64. The projections 64 thus also function as hoisting attachment receiving portions.

The through-holes 66 of the projections 64 of the end plates 23, 24 may be omitted. For example, the surfaces of each projection 64 in the thickness direction may be flat. Alternatively, each projection 64 may have a recess.

The attachment portion of each projection 64 may have any shape as long as the corresponding harness 54 can be attached to the projection 64. For example, the attachment portion may be a protrusion protruding from the projection 64.

The connecting surfaces 53a of the connecting terminals 51 may face the inner surface 12b of the main body 12. In this case, the projections 64 preferably project in a direction in which the connecting surfaces 53a and the inner surface 12b of the main body 12 face each other.

The connecting terminals 51 may be omitted, and the harness 54 may be directly fixed to the positive terminal 30 and the negative terminal 31 of the battery cells 25.

In addition to the direction in which the connecting surfaces 53a of the connecting terminals 51 and the corresponding inner surface 11a of the casing 11 face each other, the projections 64 may project in a direction toward one of the inner surfaces 11a of the casing 11 that is different from the inner surface 11a that faces the connecting surfaces 53a. Instead of the direction in which the connecting surfaces 53a of the connecting terminals 51 and the corresponding inner surface 11a of the casing 11 face each other, the projections 64 may project in a direction toward one of the inner surfaces 11a of the casing 11 that is different from the inner surface 11a that faces the connecting surfaces 53a. That is, the projections 64 may project in any directions. For example, the projections 64 may project in a direction in which the battery module 21 is moved easily. When the battery module 21 is fixed to a side surface of the casing 11, lateral movement of the battery module 21 between side surfaces is greater than vertical movement of the battery module 21 between the lower surface and the upper surface. Thus, the projections 64 project toward the side surface.

The shape of the connecting terminals 51 may be changed.

The number of the battery cells 25 may be increased or reduced.

The battery cells 25 may be connected in parallel.

Only one of the end plates 23, 24, which hold the battery unit 22, may be provided with the projection 64.

The brackets 71 may be fixed to the casing 11 with any desirable fastening members other than the bolts B2.

Each of the end plates 23, 24 may be formed integrally with the bracket 71.

The through-holes 66 may have a shape different from an elongated hole.

In place of the through-hole 66, each projection 64 may have a cutout.

The battery unit 22 does not necessarily need to have the battery holders 40.

The harnesses 54 may be attached to the end plates 23, 24 with adhesive.

The number of the battery module 21 may be singular or plural.

What is claimed is:
1. A battery pack comprising:
a casing having an inner surface; and
a battery module accommodated in the casing, wherein the battery module includes:

a battery unit having a plurality of battery cells, which are arranged side by side; and two end plates, which hold the battery unit in between, at least one of the end plates has a projection, which projects further toward the inner surface of the casing than the battery unit, the projection includes an attachment portion, which is configured such that a harness electrically connected to the battery module is attached to the attachment portion, and the attachment portion includes an opening periphery which provides the projection with a through-hole to facilitate attachment of the harness to the attachment portion.

2. The battery pack according to claim 1, wherein the battery module includes a connecting terminal, the connecting terminal has a connecting surface, which faces the inner surface of the casing, the harness is connected to the connecting surface, and the projection projects toward the inner surface of the casing, which faces the connecting surface.

3. The battery pack according to claim 2, wherein the casing includes a main body, which has an opening, and a lid member, which closes the opening of the main body, and the connecting surface faces the lid member.

4. The battery pack according to claim 3, wherein the lid member has an inner surface, and the projection projects toward the inner surface of the lid member.

5. The battery pack according to claim 1, wherein the harness is attached to the projection with an attaching member that binds the harness to the opening periphery of the projection.

* * * * *